(12) United States Patent
Shur et al.

(10) Patent No.: US 9,769,617 B2
(45) Date of Patent: Sep. 19, 2017

(54) SYSTEM AND METHODS WHICH USE LOW WIRELESS DATA BANDWIDTH CONSUMPTION FOR TRACKING WANDERING DEVICES

(71) Applicant: VESTIGO TECHNOLOGIES LTD, Tel-Aviv (IL)

(72) Inventors: Shlomo Shur, Fairfield, CT (US); Shai Bar-Lavi, Great Neck, NY (US)

(73) Assignee: VESTIGO TECHNOLOGIES LTD., Tel-Aviv (IL)

( * ) Notice: Subject to any disclaimer, the term of this patent is extended or adjusted under 35 U.S.C. 154(b) by 0 days.

(21) Appl. No.: 15/035,801
(22) PCT Filed: Nov. 9, 2014
(86) PCT No.: PCT/IL2014/050975
§ 371 (c)(1),
(2) Date: May 11, 2016
(87) PCT Pub. No.: WO2015/068169
PCT Pub. Date: May 14, 2015

(65) Prior Publication Data
US 2016/0286355 A1  Sep. 29, 2016

(30) Foreign Application Priority Data
Nov. 11, 2013 (IL) .......................................... 229369

(51) Int. Cl.
G08B 21/00 (2006.01)
H04W 4/02 (2009.01)
(Continued)

(52) U.S. Cl.
CPC .......... *H04W 4/025* (2013.01); *G01S 5/0027* (2013.01); *H04W 4/02* (2013.01); *H04W 8/24* (2013.01);
(Continued)

(58) Field of Classification Search
CPC ........ G01S 5/0027; G08G 1/20; H04W 4/025
(Continued)

(56) References Cited

U.S. PATENT DOCUMENTS 7,366,522 B2 * 4/2008 Thomas ................. H04W 4/02
340/539.13
7,518,502 B2   4/2009 Austin et al.
(Continued)

FOREIGN PATENT DOCUMENTS

EP   2 290 907   3/2011

OTHER PUBLICATIONS https://web-beta.archive.org/web/20130926121239/%20http://gps-tracker-review.toptenreviews.com, Sep. 26, 2013, pp. 1-4.

*Primary Examiner* — Mark Rushing
(74) *Attorney, Agent, or Firm* — Browdy and Neimark, P.L.L.C.

(57) ABSTRACT

A system for monitoring locations of each of a population of wandering devices, each having localizing functionality, the system comprising a tracking functionality operative for monitoring locations of each of the population of wandering devices and accordingly, providing location information which characterizes individual wandering devices from among said population, via a viewing functionality, to corresponding end-users registered in respective association with the wandering devices; and an interface with the wandering devices operative to command that location information regarding at least one individual wandering device be transmitted to the tracking functionality more frequently if at least one individual end-user registered in respective association with the individual wandering device is logged onto a viewing functionality and less frequently if no end-user registered in respective association with the individual wandering device is logged onto the viewing functionality.

25 Claims, 18 Drawing Sheets

(51) Int. Cl.
*G01S 5/00* (2006.01)
*H04W 8/24* (2009.01)
*G08G 1/00* (2006.01)

(52) U.S. Cl.
CPC ............... *G08G 1/20* (2013.01); *H04W 4/021* (2013.01); *H04W 4/027* (2013.01); *H04W 4/028* (2013.01)

(58) Field of Classification Search
USPC .................................................... 340/539.13
See application file for complete search history.

(56) References Cited

U.S. PATENT DOCUMENTS

| | | | |
|---|---|---|---|
| 7,545,850 B1* | 6/2009 | Norman | G01S 19/09 342/357.46 |
| 2002/0177476 A1* | 11/2002 | Chou | G01S 5/0027 455/574 |
| 2010/0214068 A1* | 8/2010 | Nadkarni | G01S 5/22 340/10.1 |
| 2013/0060921 A1* | 3/2013 | Gadhia | H04L 67/18 709/220 |
| 2013/0197857 A1 | 8/2013 | Lu et al. | |
| 2013/0331119 A1 | 12/2013 | Vaccari et al. | |

\* cited by examiner

Fig. 3a
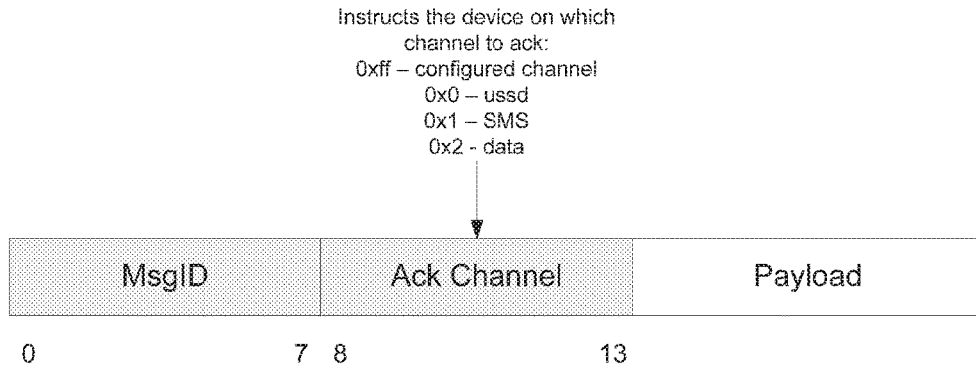
Fig. 3b
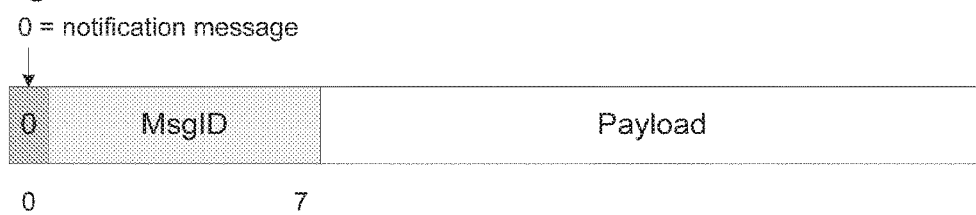
Fig. 3c:
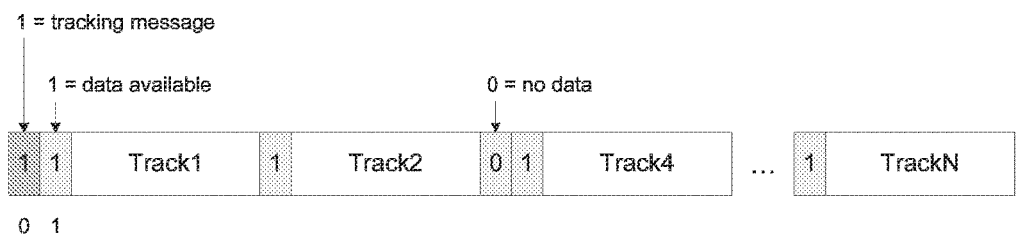
Fig. 4a:
| MsgID | Description | Parameters |
|---|---|---|
| 0x0 | Ack | MsgID of message to ack |
| 0x1 | Start tracking mode | Tracking configuration info (see below) |

Fig. 4b

| 0x2 | Stop tracking mode | |
|---|---|---|
| 0x3 | General Setup | 0 - USSD/ 1 - SMS/ 2 – Data (1 byte)<br>UDP control IP (4 bytes)(a.b.c.d)<br>UDP control port (2 bytes)(max = 65536)<br>Device ID (4 bytes)<br>Phone number for Voice (20 digits - BCD)(10 bytes)<br>Response Delay Time (secs) (1byte)<br>Calls to Device (1 byte)<br>0 – Ignore, 1 – Answer, 2 – Send Caller ID and Answer, 3 – Send Caller ID and wait for server confirmation<br>GPS on When Charging (1 byte)<br>0 - Off/ 1 – on |
| 0x4 | TestMode | 0 - Off/ 1 - on |

Fig. 4c

| 0x5 | StatusRequest | |
|---|---|---|
| 0x6 | Set Alarm | Set Alarm Message Payload (e.g. as described below) |
| 0x7 | Stop Alarm | AlarmID |
| 0x8 | Delete File | |
| 0x9 | Beep | |
| 0xa | Reboot | |
| 0xb | Backup | 0 - Off/ 1 - On |
| 0xc | GPS Search Mode | Timer1 (1 byte), timer2 (1 byte) |
| 0xd | GPS Fix In Moving | Timer (1 byte) |
| 0xe | Clear All Alarms | |
| 0xf | Periodical Status Report | 0 – Off/1 – On (1 byte), timer(1 byte) |
| 0x10 | GPS on power on | 0 –Off/1 – On (1 byte) |

Fig. 4d

| 0x11 | Get History | From Timestamp (4 bytes) To Timestamp (4 bytes) |
|---|---|---|
| 0x12 | Voice Call | 0 – Dial/1 – Hangup Phone number for Voice (20 digits - BCD)(10 bytes) (0 – default) |
| 0x13 | Get IMSIs | |
| 0x14 | Get Carriers | |
| 0x15 | Get Single GPS Location | Force GPS read: 0 – Off/1- On Send GSM before Lock (1 byte) 0 – Off/ 1 - On |

Fig. 4e

| 0x16 | Debug Mode | 0 – Off/1 – On (1 byte) |
|---|---|---|
| 0x17 | FenceAlarm | Cooldown(mins) (1byte)<br>Sample Rate (mins) (1 byte)<br>Alarm id (1 byte, 1-255)<br>Alarm channel(1 byte, note:every fence alarm should have same channel)<br>0-Off.1-On(1 byte)<br>Alarm number (1byte,1 - 5)<br>Lat1(5bytes)<br>Long1(5bytes)<br>Lat2(5bytes)<br>Long2(5bytes)<br>Trigger direction(1:out to in,2:in to out, 3:out to in and in to out) |
| 0x18 | FenceAlarmOnOff | Alarm number (1byte,1 - 5)<br>0-Off.1-On(1 byte) |
| 0x19 | SpeedAlarm | Cooldown(mins) (1byte)<br>Sample Rate (mins) (1 byte)<br>Alarm number (1byte,1 - 255)<br>Alarm channel(1 byte, note:every alarm should have same channel)<br>0-Off.1-On(1 byte)<br>Alarm number (1byte,1 - 5)<br>Speed threshold (mph) (1 byte)<br>0 - Under/1 - Over trigger (1 byte) |

Fig. 4f

| 0x1a | MovingAlarm | Cooldown(mins) (1byte)<br>Sample Rate (mins) (1 byte)<br>Alarm number (1byte,1 - 255)<br>Alarm channel(1 byte, note:every alarm should have same channel)<br>0-Off.1-On(1 byte)<br><br>0 - Move/1 - Stop trigger (1 byte) |
|---|---|---|
| 0x1b | BatteryAlarm | Cooldown(mins) (1byte)<br>Sample Rate (mins) (1 byte)<br>Alarm id (1byte,1 - 255)<br>Alarm number (1byte, 1-3)<br>Alarm channel(1 byte, note:every alarm should have same channel)<br>0-Off.1-On(1 byte)<br><br>Battery percent threshold (1 byte,"100,65,35,10,5") |
| 0x1c | SetAPN | APN (variable length string) |
| 0x1d | SetActiveImsi | Active IMSI (string)(no change if empty) |
| 0x1e | SetActiveCarriers | Active Carrier (string) (no change if empty) |
| 0x1f | Status2Request | |
| 0x20 | WakeUpWhenOff | On period (min)(1byte)<br>Off period (min) (1byte) |
| 0x21 | ConfirmCallerId | |
| | | |

Fig. 5a:

| AlarmID | Alarm Type | Alarm Mode | Cooldown (mins) | Alarm Params ... |
|---------|------------|------------|-----------------|------------------|
| 1 byte  | 1 byte     | 1 byte     | 1 byte          | X bytes          |

Fig. 5b:

| Alarm Type | Description | Params |
|------------|-------------|--------|
| 0x0 | Fence | North (5 bytes),<br>South (5 bytes),<br>East (5 bytes),<br>West (5 bytes),<br>Trigger Direction: 0 -In/ 1 - Out (1 byte) |
| 0x1 | Speed | Speed threshold (mph) (1 byte),<br>0 - Under/1 - Over trigger (1 byte) |
| 0x2 | Movement | 0 - Move/1 - Stop trigger (1 byte) |
| 0x3 | Battery | Battery percent threshold (1 byte)<br>0 - Under/1 – Over (1 byte) |
| 0x4 | Shaking | Amplitude (1 byte)<br>Duration (1 byte) |
| 0x5 | Blind | |

Fig. 9

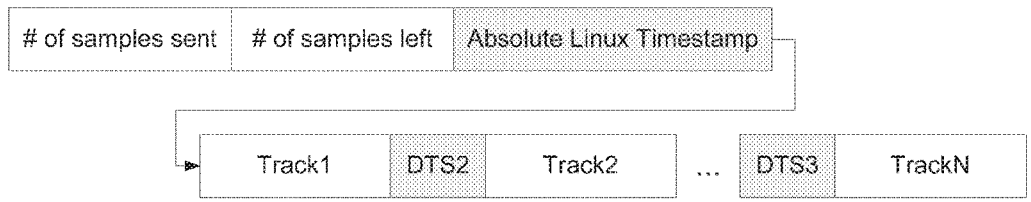

Fig. 6a:

| MsgID | | |
|---|---|---|
| 0x0 | Ack | MsgID of message to ack, <br> May add status data after ack |
| 0x1 | StatusReport | 0 - USSD/ 1 - SMS/ 2 – Data (1byte) <br> UDP ip (4 bytes) <br> UDP port (2 bytes) <br> APN (variable length string) <br> Device ID (4 bytes) <br> IMEI (16 digits - BCD)(8 bytes) <br> Tracking configuration info (see below) <br> TestMode off/on (1 byte) <br> Number of active alarms (1 byte) <br> Active alarm ids (concatenated strings) <br> GPS on When Charging (1 byte) <br> 0 - Off/ 1 – on <br> Wake Up When Off (1 byte) <br> 0 - Off/ 1 – on |
| 0x2 | Alarm Triggered | AlarmID (1 byte) <br> Latitude (5 bytes) <br> Longitude (5 bytes) <br> Speed (1 byte) <br> Param (1 byte) – custom per each alarm. IE, in/out for fence |
| 0x3 | Button | Button ID (1 byte) <br> Latitude (5 bytes) <br> Longitude (5 bytes) <br> Speed (1 byte) <br> Duration (1 byte) |
| 0x4 | GPS Upload | |

Fig. 6b:

| 0x5 | Report IMSIs | Number of imsis (1 byte)<br>Imsis (concatenated strings)<br>Index of active Imsi (1 byte) |
|---|---|---|
| 0x6 | Report Carriers | Number of carriers (1 byte)<br>Carriers (concatenated strings)<br>Index of active carrier (1 byte) |
| 0x7 | Single GPS Location Report | Latitude (5 bytes)<br>Longitude (5 bytes)<br>Speed (1 byte)<br>Number Of Satelites (1 byte)<br>Signal Strength (1 byte)<br>Is Fix (1 byte)<br>Battery Percent Status (1 byte) |
| 0x8 | Debug Message | Debug String (String) |

Fig. 6c:

| 0x9 | Single GSM Location Report | CellID (variable length string)<br>LAC (variable length string)<br>MCC (variable length string)<br>MNC (variable length string)<br>Battery Percent Status (1 byte) |
|---|---|---|
| 0xa | Status2Report | Byte Count (3 bytes)<br>History Size (3 bytes)<br>Battery Percent Status (1 byte)<br>CellID (variable length string)<br>LAC (variable length string)<br>MCC (variable length string)<br>MNC (variable length string)<br>Number Of Satelites (1 byte)<br>Signal Strength (1 byte)<br>Is Fix (1 byte)<br>Minutes since last fix (3 bytes)<br>Response Delay Time (secs) (1byte) |
| 0xb | Powerup | Wakeup (1 byte) |
| 0xc | Powerdown | |
| 0xd | History Report | e.g. as described herein (History) |
| 0xe | Report CallerID | Phone number (20 digits - BCD)(10 bytes) |

Fig. 7a:
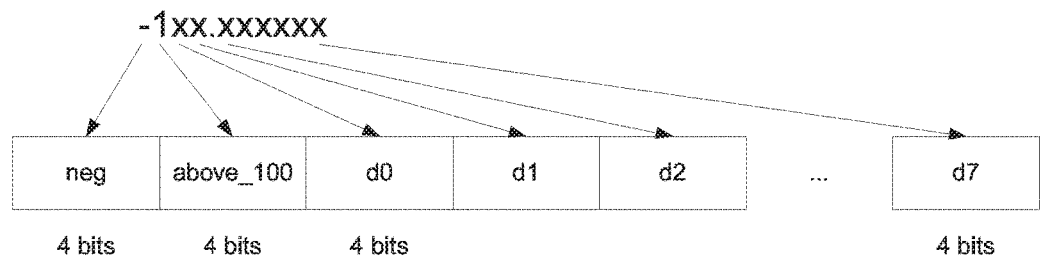
Fig. 7b:
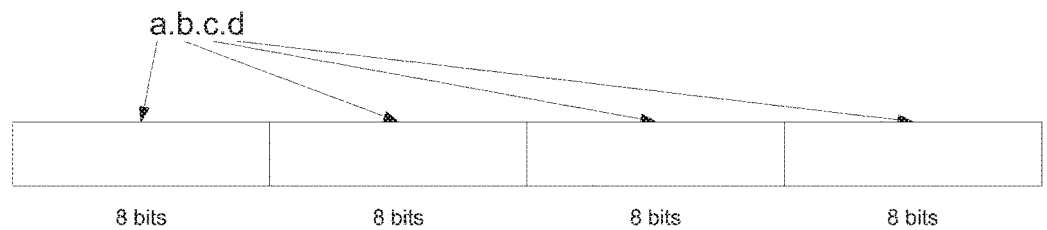
Fig. 8a
| Location Accuracy | X_lat | X_long |
|---|---|---|
| Low | 23 | 24 |
| High | 31 | 32 |
| Debug | 39 | 40 |
Fig. 8b:
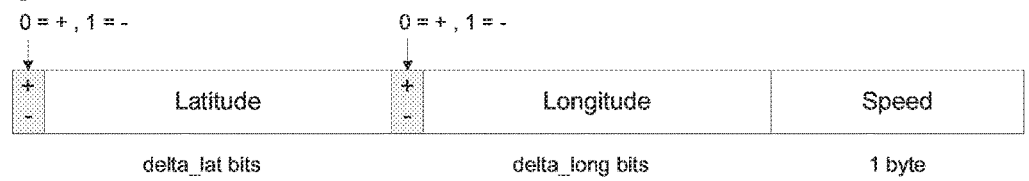

Fig. 8c:

| Location Accuracy | X_lat | X_long |
|---|---|---|
| Low | 16 | 16 |
| High | 24 | 24 |
| Debug | 32 | 32 |

FIG. 10a

10: tag wanderers to be monitored (kids, pets, luggage, vehicle...) with trackable devices having co-located accelerometers
↓
20: use a processor to register end-user/s associated with each device & provide access to viewer functionality (website/phone app e.g.)
↓
30: use a processor to store per-channel cost info per region & per country
↓
40: use a processor to command devices to conserve battery power by sampling location yes/no with hi/lo periodicity as function of being mobile/stationary
↓
50: use a processor to generate and send channel prioritization info to devices, based inter alia on step 80 herein. typically, select high-reliability/"data" communication channel (e.g. GPRS or 3G) or low-reliability communication channel (USSD or SMS, e.g.), based on comparison of current relative cost effectiveness of channels (financial cost &/or performance)
↓

60: use a processor to command devices to transmit samples yes/no with high/lo periodicity as function of whther device's end-user/s are on-line

↓

65: use a processor to command devices to transmit samples with hi/lo compression level, depending on real-time criteria inter alia

↓

70: devices use hi-priority channel (as per step 50) to transmit samples compressed (hi/lo as per step 65) based on effective dynamic range &/or on eliminating shared bits of batched samples

↓

80: use a processor to accumulate channel history data re stability of transmissions from devices as function of channel, channel provider, region, country

Fig. 11a

| A | *Device Marker Icon* | icon associated with a device used for representing the device on the map. |
|---|---|---|
| B | *Device Nickname* | The nickname chosen for device. Appear in emails and notifications/alerts. |
| C | *Device Info Pop Up* | Provides location and speed information about device, may be located adjacent e.g. above device marker on the map. |
| D | *Notification Menu* | Shows users all device notifications. |
| E | *User Menu* | Provides user specific options such as logging out or activating another device. |
| F | *Device Location Information* | Provides location and speed information about the device. |
| G | *Update Location Button* | Updates the device location. |

| | | |
|---|---|---|
| H | *Tracking Frequency Selector* | option to select how frequently device updates its location since more frequent device updates on location shorten battery life |
| I | *Alarms Menu Button* | Setting alarms and notifications. |
| J | *Fences Menu* | Setting and configuring fences. |
| K | *View History Selector* | Selects the device history and shows it on the map. |
| L | *Search and Center Map around Location* | Allows entering an address and clicking on the search button to center the map on a specific address. |
| M | *Device Notifications* | List of device notifications. |

Fig. 11b

SYSTEM AND METHODS WHICH USE LOW WIRELESS DATA BANDWIDTH CONSUMPTION FOR TRACKING WANDERING DEVICES

REFERENCE TO CO-PENDING APPLICATIONS

None.

FIELD OF THIS DISCLOSURE

The present invention relates generally to tracking and more particularly to tracking GPS-localizing devices.

BACKGROUND FOR THIS DISCLOSURE

Many different GPS trackers are commercially available e.g. as reviewed on the Web at gps-tracker-review.toptenreviews.com. TopTenREVIEWS describes GPS trackers as follows: "Through the use of a small device and a simple software application on your Mac, Windows PC or smartphone, you can monitor their location from anywhere. These GPS navigators are small and easy to set up and use, and will show you an updated, time-stamped location of your child, teen or even a pet that tends to run away. It will also keep a history of where they've been . . .
( . . . ) GPS trackers differ from vehicle navigational systems in that they are specifically used for keeping track of an individual or a pet. . . . They can also be used by hikers to help them find their way back to their car or tent . . . the GPS tracker makes an excellent vehicle tracking system. GPS trackers . . . use sophisticated satellite technology, (but) they are . . . easy to set up and place in a car, in your child's backpack or on your pet's collar, Then you just use your computer or smartphone to monitor where they are . . . it should . . . be simple and intuitive to set up the software or web-based user interface to track on your computer or smartphone. . . . The features should include monitoring software for your computer and possibly a smartphone app, an intuitive interface and maps so the alerts show exactly where your loved one or pet has been, and it should be small and portable. . . . Battery life is important because there will be times when you may be monitoring for a large park of the day. ( . . . ) you should be able to set up alerts telling you at designated time intervals the location of the GPS tracking device, which you can also view on a map. Details include the geographical location, the speed the device was travelling and the time of the recording, You should also be able to access the GPS tracker's location history on a map. Some of the GPS tracker manufacturers may add in additional tracking features, such as geo-fencing, where you can set up a specific area in the software's maps that will alert you if your child or teen travels outside that agreed-upon zone . . . access the location data from an internet-connected Mac or Windows PC, or from your smartphone.

The disclosures of all publications and patent documents mentioned in the specification, and of the publications and patent documents cited therein directly or indirectly, are hereby incorporated by reference. Materiality of such publications and patent documents to patentability is not conceded

SUMMARY OF CERTAIN EMBODIMENTS

Certain embodiments of the present invention seek to provide a system and methods for efficiently tracking location, speed and sensory data of devices at a minimal cost and wireless data bandwidth consumption, using, say, GPS and/or GSM-based technology to track everything and anything an end-user does not want to lose. Typically, there is full duplex communication between device and server and each device can but may not, transmit and receive data continuously.

Data may be sent directly from a handset or device to a mobile operator who may provide service to a handset and "own" the SIM card.

Servers may be operatively associated with e.g. connected to the mobile operator and by the use of suitable communication algorithms e.g. as described herein, may be operative to send to and receive data from a specific device. Use of the channel is efficient; instead of sending complete Longitude and Altitude values over the USSD channel, compressed information is sent that is decoded on the servers which then compute the actual position of the device accordingly.

For reduction of load on operators' antennas at peak times, position data may be sent depending on the system's disposition at the time. For example, to reduce communication load on the network, multiple device positions or information from which same can be derived by the server, and/or other relevant information may be sent in a single USSD packet.

Typically, server/s are operative for commanding the device in real time thereby to tailor device behavior at each point in time e.g. as a function of disposition of interaction between end user and system at that specific time. For example, the device may store information internally e.g. if no users are found to be on-line, watching the screen and tracking the device in real time. The device may subsequently send the stored information back to the home base (e.g. servers) via highly compressed packets when this becomes desirable or necessary. Different algorithms may be used to send different types of data from device to server. For example, acceleration and movement information generated by a device-internal (i.e. on-board) accelerometer may be employed to determine whether the device needs to be sending, since if the device is stationary, communications may not need to be generated e.g. if there is a pre-programmed server assumption that if no communication is received, this denotes lack of motion, perhaps under certain circumstances and assumptions.

Certain embodiments of the present invention seek to provide a server which selects, at intervals, a most efficient channel via which to communicate with the device.

Certain embodiments of the present invention seek to provide a system for monitoring each of a population of registered wandering or mobile devices, also termed herein "personal tracking devices", and to provide pre-selected alerts to registered end-users which are remotely located, relative to the device, all with minimum load on cellular (e.g.) network infrastructure. Each device or "TGD" may have GPS functionality and may be worn by a moving entity (vehicle, individual animal or person, luggage, other) to be tracked e.g. may be mounted on a bracelet for an elderly person, or child, or chronically ill person to wear, or in a vehicle, or on a pet's collar, or may be fashioned as a clip-on device to clip on a child's backpack or stroller. Registered end users may log into a tracking website using ID information e.g. e-mail and password and see "their" device's location.

Certain embodiments of the present invention seek to reduce or minimize the bandwidth that a GPS tracker requires from a cellular network.

Certain embodiments of the present invention seek to provide smart, typically real time selection of channels for communication between wandering devices e.g. GPS tracker devices and their servers By availing itself of various different channels, the load on data channels, particularly, remains low and is split between various channels rather than burdening one specific channel.

Channels may be selected from among available channels which may include some or all of:
1. SMS (Short Message Service).
2. USSD (Unstructured Supplementary Service data)
3. GPRS (General packet radio service) mobile data service for 2G and 3G cellular communication for mobile communications (GSM).
4. Multi IMSI (International mobile Subscriber Identity) providing the ability to connect to multiple carriers with a single SIM card.

Initially communications may utilize either USSD or SMS channels, whose very short messages place but a minimal load, if any, on the carriers.

Certain embodiments of the present invention seek to provide apparatus and methods operative to minimize load on GSM cellular towers serving GPS tracker devices e.g. utilizing one or more of the following:

Data Compression allowing Latitude and Longitude information localizing a device to be transmitted in a total of say 32 bits (4 bytes) and nonetheless to establish the position of the device at an accuracy of within 4 meters.

Multi Access Accelerometer e.g. a tri-axial low G sensor which measures G force on the device along 3 axes e.g. for detecting stationary periods for individual devices.

No Look/No Send—If the tracking device is not being monitored "live" from the website or a mobile device, the device collects its location data e.g. for a predetermined time interval, rather than sending same to the server, thereby to reduce amount of data and "per position" packet size.

Store and Forward—The device's UPS coordinates, typically time-stamped, are stored for later transmission to the server while the device is not connected to a GSM network.

"Real Time Communications Least Load Routing" The server constantly monitors the device and user requirements and adjusts communication methods/channels to minimize cost and load on network infrastructure.

Certain embodiments of the present invention seek to provide a system which is operative to operate worldwide, anywhere where GSM networks are available. For example, each tracker device may comprise a Quad GSM device that operates on GSM frequencies 850, 900, 1800 and 1900. When activated anywhere in the world, the device may establish communication with system servers via a "Global" IMSI (International mobile Subscriber Identity) operational anywhere in the world. The server typically commands the device as to which IMSI to use so communication occurs at maximum efficiency.

As an example, a user is currently located in the USA and is currently tracking a device that is currently located in South Africa and is registered on the GSM network in South Africa. The user is logged in via the web or an app on a mobile device to the system servers which are located on a "cloud" server which may or may not be in the USA. When a tracking command is sent to the device from the user (through website or mobile app, which forward the request to the server), the request is transmitted to a network partner e.g. network operator with a roaming agreement with local carriers worldwide. The request is then transmitted to a local operator in South Africa which in turn sends the signal via the mobile GSM network to the device. Upon receipt of the request, the device acknowledges the request and in turn sends its GPS coordinates or indications thereof to the local operator. The GPS coordinates, as received or as computed, then proceed from the local operator to the network partner (e.g. MANX) and via Internet to servers in the "cloud".

The present invention thus typically includes at least the following embodiments:

Embodiment 1

A system for monitoring locations of each of a population of wandering devices, each having localizing functionality, the system comprising:

a tracking functionality operative for monitoring locations of each of the population of wandering devices and accordingly, providing location information which characterizes individual wandering devices from among said population, via a viewing functionality, to corresponding end-users registered in respective association with the wandering devices; and an interface with said wandering devices operative to command that location information regarding at least one individual wandering device be transmitted to said tracking functionality more frequently if at least one individual end-user registered in respective association with the individual wandering device is logged onto a viewing functionality and less frequently if no end-user registered in respective association with the individual wandering device is logged onto the viewing functionality.

Embodiment 2

A system according to Embodiment 1 wherein said location information transmitted more frequently and said location information transmitted less frequently both include information sampled at the same rate such that said location information transmitted less frequently includes wandering device location samples transmitted to said tracking functionality in larger groups than said location information transmitted less frequently.

Embodiment 3

A system according to Embodiment 2 wherein said wandering device location samples transmitted to said tracking functionality in batches are transmitted in compressed form, by eliminating bits which are common to more than one adjacent location sample.

Embodiment 4

A system according to any of the preceding Embodiments wherein location information regarding an individual wandering device is transmitted to said tracking functionality after being compressed by a compression functionality and wherein said compression functionality takes into account an effective dynamic range of the location information by eliminating from said location information, those bits which are common to all location samples within said effective dynamic range.

Embodiment 5

A system according to any of the preceding Embodiments wherein at least one individual wandering device includes self-motion detection apparatus (e.g. a co-located accelerometer) and wherein for at least said individual wandering device, location sampling is not effected while said self-motion detection apparatus indicates that said individual wandering device is stationary, thereby to conserve battery power.

Embodiment 6

A system according to Embodiment 5 wherein for at least said individual wandering device, transmission of location information is at least some times delayed if said self-motion detection apparatus indicates that said individual wandering device is stationary.

Embodiment 7

A system for monitoring locations of each of a population of wandering devices, the system comprising:
a population of wandering devices each having localizing (e.g. GPS) functionality; and
a tracking functionality operative for monitoring locations of each of the population of wandering devices and accordingly, providing location information which characterizes individual wandering devices from among said population, to corresponding individual end-users registered in respective association with the individual wandering devices,
wherein said location information is transmitted from said wandering devices to said tracking functionality using a high-reliability communication channel (e.g. GPRS or 3G) or a low-reliability communication channel, and wherein one of said channels is selected for usage based on a comparison of computerized data representing current cost effectiveness values of said channels respectively.

Embodiment 8

A system according to according to any of the preceding embodiments
wherein first and second wandering devices from among said population are located in first and second countries respectively served by a high-cost high-reliability communication channel and a low-cost high-reliability communication channel and wherein location information is transmitted from said first and second wandering devices to said tracking functionality using a low-reliability communication channel and said low-cost high-reliability communication channel respectively, based on stored information regarding costs of high-reliability communication channel usage in said first and second countries.

Embodiment 9

A system according to any of the preceding Embodiments wherein said tracking functionality communicates with said population of wandering devices using a high-reliability communication channel (e.g. GPRS or 3G) or a low-reliability communication channel, and wherein one of said channels is selected for usage based on a comparison of current relative cost effectiveness of said two channels.

Embodiment 10

A system according to according to any of the preceding embodiments
wherein said location information is transmitted from said wandering devices to said tracking functionality using a high-reliability communication channel or a low-reliability communication channel, and wherein one of said channels is selected for usage based on a comparison of current relative cost effectiveness of said channels.

Embodiment 11

A system according to any of Embodiments 7-10 wherein said low-reliability communication channel comprises USSD.

Embodiment 12

A system according to according to any of the preceding embodiments and also comprising networked viewing functionality through which said location information which characterizes individual wandering devices from among said population is provided to said corresponding end-users.

Embodiment 13

A system according to according to any of the preceding embodiments wherein said location information transmitted less frequently includes wandering device location samples transmitted to said tracking functionality in batches of more than one sample each whereas said location information transmitted less frequently includes wandering device location samples transmitted to said tracking functionality individually.

Embodiment 14

A method for monitoring locations of each of a population of wandering devices, each having localizing functionality, the method comprising:
providing a tracking functionality which uses a processor for monitoring locations of each of the population of wandering devices and accordingly, providing location information which characterizes individual wandering devices from among said population, via a viewing functionality, to corresponding end-users registered in respective association with the wandering devices; and
using a processor to command that location information regarding at least one individual wandering device be transmitted to said tracking functionality more frequently if at least one individual end-user registered in respective association with the individual wandering device is logged onto a viewing functionality and less frequently if no end-user registered in respective association with the individual wandering device is logged onto the viewing functionality.

Embodiment 15

A method according to according to any of the preceding embodiments wherein location information regarding an individual wandering device is transmitted to said tracking functionality after being compressed by a compression functionality which takes into account an effective dynamic range of the location information by eliminating from said location information, those bits which are common to all location samples within said effective dynamic range.

Embodiment 16

A method for monitoring locations of each of a population of wandering devices, each having localizing (e.g. GPS) functionality, the method comprising:

providing a tracking functionality which uses a processor for monitoring locations of each of the population of wandering devices and accordingly, providing location information which characterizes individual wandering devices from among said population, to corresponding individual end-users registered in respective association with the individual wandering devices, wherein said location information is transmitted from said wandering devices to said tracking functionality using a high-reliability communication channel (e.g. GPRS or 3G) or a low-reliability communication channel, and wherein one of said channels is selected for usage by a processor which performs a comparison of computerized data representing current cost effectiveness values of said channels respectively.

Also provided is a system for monitoring locations of each of a population of wandering devices, each having localizing functionality, the system comprising:

a tracking functionality operative for monitoring locations of each of the population of wandering devices and accordingly, providing location information which characterizes individual wandering devices from among said population, via a viewing functionality, to corresponding end-users registered in respective association with the wandering devices; and an interface with the wandering devices operative to command that location information regarding an individual wandering device, before being transmitted to the tracking functionality, be compressed by a compression functionality which takes into account an effective dynamic range of the location information by eliminating from the location information, those bits which are common to all location samples within the effective dynamic range.

Also provided, excluding signals, is a computer program comprising computer program code means for performing any of the methods shown and described herein when said program is run on a computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 1a-1b, 2, 3a-3c, 4a-4f, 5a-5b, 6a-6c, 7a-7b, 8a-8c, 9 are diagrams useful in understanding certain embodiments of tracking systems and methods shown and described herein.

FIGS. 10a-10b, taken together, form a simplified flowchart illustration of a tracking method for monitoring objects of value. The method of FIGS. 10a-10b, taken together, typically comprises some or all of the illustrated steps, suitably ordered e.g. as shown.

FIGS. 11a-11b, taken together, form a table useful in understanding certain embodiments of tracking systems and methods shown and described herein. Generally, each table presented herein may include some or all of the fields and/or records shown.

Figure 1A:
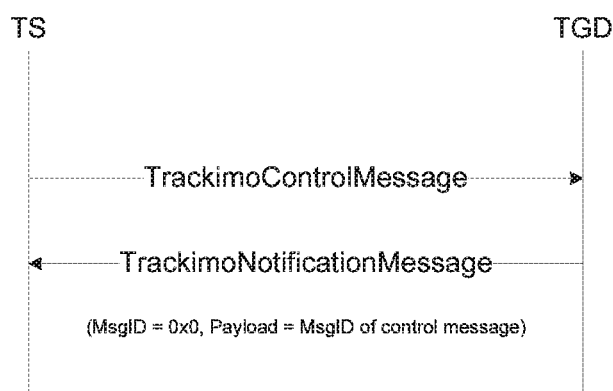

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

According to certain embodiments, an end-user device ("device") uses a suitable satellite (e.g.) based navigation system such as GPS (Global Positioning System) and cell ID technology to position itself and uses a suitable communication network e.g. wireless GSM network to transmit those positions to central location's e.g. to system server/s via a web-based portal for viewing.

Typically, a lightweight signaling channel e.g. USSD is used when feasible, which is advantageous because this does not consume any data from the GSM (say) data network, thereby to significantly reduce the amount of data transmitted, hence the number of IP data sessions used by the system, and hence cost of communications.

When GPS coordinates are received, encrypted if desired, in the servers, a data connection is made with third party servers (e.g. Google Maps) that provide a map and exact address for the tracked device. Location information such as map and address information is then displayed on the user mobile app or web page. The server typically also stores the history of locations reported by the device and displays this, upon request, as "history".

Typically, each device may be located anywhere in the world which is within a GSM cellular service area. If the device enters an area without GSM cellular coverage, the GPS feature does not report its current location but after re-entering an area with network coverage, a history of device locations is transmitted e.g. for online viewing.

The device itself typically provides an audio or visual indication of whether or not the device currently has access to one or both of cellular network connection and GPS connection. Availability of device x's current location data for viewing by device x's associated end-users is typically a function of availability of cellular reception for device x. However, the device x's previous locations (also referred to as "historical locations") are typically available for viewing even at a time when the device has no availability of cellular reception, as such location data is stored on and displayed from the server.

According to certain embodiments, many location samples e.g. a majority thereof, are transmitted to the viewing functionality e.g. website or phone app, in batches rather than individually.

Activating a device: once a device has connected to the cellular network and has received an accurate GPS position for itself, an end-user may browse to the supporting platform and follow an activation process in which s/he may be prompted to enter, say, a valid email address or other destination for alerts, a nickname for the user's device, and a device ID number which may be marked on the device e.g. located on the battery cover.

Upon activation, each device begins to send GPS information e.g. to a Tracking Portal and each relevant end-user can thereby access the device's location and may receive automated alerts e.g. as per user-defined GeoFences and/or other Alarm settings as described herein.

Typically each device reports its location at intervals (e.g. every 0.3 or 0.5 or 1 or 2 or 5 or 10 or 30 or 60 minutes), at least or only when the device is in tracking mode.

An end-user may view device(s) location(s) associated with her or him e.g. via Internet; via web-enabled mobile phone or from a suitable mobile app or platform typically compatible with a variety of mobile communication devices e.g. Android and iPhones.

When an end-user registers a device on the tracking application, s/he may designate trusted individuals to receive alerts and how same are to receive the alerts, e.g. via email or SMS or smartphone App-notifications. These persons may then track the device, using ID information e.g. log in and password of the registering end-user.

The platform typically saves device history (past locations vs. time) for a predetermined long period e.g. 1 year.

Any suitable alerts may be provided. For example, a GeoFence or Geofence Zone is a defined (e.g. by end-user) boundary area, typically of a certain minimal size to reduce false alarms. Alerts are then triggered when a GPS device passes in or out of this area (crosses the fence). Within the application, GeoFences can be created that are, say, circular, square, polygonal or follow the path of a route.

A GeoFence may be defined by having an end-user enter a specific address about which a geoFence is centralized and/or by a pre-defined perimeter size and/or by modify fence size and location by dragging borders and moving same on a map.

As described, once a device has been activated for the first time, the end-user may login through the website to view her or his device location information on a visual map through an interface or "dashboard".

The dashboard may include any or all of the dashboard elements A, B, . . . listed in the table of FIGS. 11*a*-11*b*.

The device location information available may include some or all of device address, time tracked, speed, battery percentage left, and longitude and latitude location of the device. Typically, the most accurate location is the GPS location. If the device is unable to get the GPS location, the device attempts to obtain GSM location data and, typically, an indicator will appear in the device location information notifying that the location is based on the cellular network. Device Location Information may for example be provided:
1. When clicking on the device marker icon on the map, inside an information pop up right above the device marker icon; and/or
2. When clicking on the device within the dashboard, location information may be presented adjacent e.g. below the device name.

Responsive to an end-user clicking on the update location button, the system may attempt to contact the device through the cellular network and retrieve the devices exact location (GPS based location, or location data based on mobile network signals to the device). If the device is unreachable within 60 seconds (parameter), e.g. because:
1) the device is turned off
2) the device is out of battery
3) the device is in an area that does not have cell phone reception,
the system may notify the user with an information notification.

Typically, device location frequency is set by the user and may even be manual (the device location may only update when the user clicks the update location button. This ensures the longest battery life to the device.). Typically, when the device reaches 10% (parameter) battery life, it automatically switches to manual mode to conserve the device battery.

The device history can be displayed on the map upon user request. The map functionality may display history marker icons in grey and may connect the markers to indicate the device tracking path and may number the device marker icons to form a device history timeline. The device history can be shown from: the last hour, today, the last week, and by specifying a specific date and time range (start and end). Clicking on any device marker info from the history may show the time of the history, the location and the speed. The map may automatically also zoom to show all the history of the device in a single view. One can also zoom in and out to better view the device history.

Alarms are sent to configured user-selected individuals, e.g. via their designated email addresses, and to the dashboard. The notification alarms typically include the device location and speed at the time the alarm is triggered. Some or all of the following alarms may for example be provided: notification when a speed limit is crossed, notification when a device battery level is low, notification when a device starts to move, notification when a device stops moving, notification when a right key is pressed on the device, notification when a left key is pressed on the device, notification when an SOS key is pressed on the device.

Optionally, each device is commanded to operate in tracking mode or not tracking mode=on/off; or mode=tracking/normal) by the server and when (typically only when) in tracking mode, the device periodically samples location and periodically transmits (reports) the sampled information to the server (typically via the viewing functionality) where the sampling and reporting periods are typically as per command from the server.

The term normal mode as used herein means the device is ON but is not in tracking mode. In this mode, the device is connected to the network and waiting for a communication event from the server, and is ready to transmit to the server any local events such as alarms.

If the device is in normal mode it is not usually in a data mode since data mode consumes operator's resources such as ports and sessions on the operator's data servers. For incidental communication between the server (user) and the device the server may use SMS and USSD communication methods which consume very few resources on the operator's infrastructure.

Tracking Mode:

Each time the position of the device is reported to the server this is taxing for the network because data is sent to the server to report the current position of the device. In order to minimize resultant load on the network a smart decision of which channel is to be used may be made typically by the server. Most taxing is when the device is set to constantly send its current position because this consumes the largest amount of network resources. Some or all of the following optimizations may therefore be employed:
1. Server may chose the most efficient way of communication at each specific instance e.g. based on device disposition and type of tracking requested.
2. When data is transmitted via data channel or USSD channel, compression is used. Typical information per UPS position may average less than 6 bytes (48 bits) per GPS position.
3. Device optionally only sends GPS position if the device is known to be in motion. Therefore, while the device is not in motion there is typically no data consumption.

4. Optionally, device does not send time stamp information due to the compression process, yielding significant data efficiency which in turn reduces the load on the operator's resources.

Server may instruct the device to use reporting intervals depending on the end user disposition. If nobody is monitoring the device in real time then perhaps no data will be sent or data may be sent less frequently; data may be aggregated or packaged into larger "packages" or batches and sent at intervals or at longer intervals and/or per server request to the server. This yields significant load reduction on the infrastructure. More generally, the interface with the wandering devices is typically operative to command that location information regarding at least one individual wandering device be transmitted to said tracking functionality more frequently if at least one individual end-user registered in respective association with the individual wandering device is logged onto a viewing functionality and less frequently if no end-user registered in respective association with the individual wandering device is logged onto the viewing functionality.

Typically, information transmitted is compressed by the device in accordance with either of a normal compression mode and a high compression mode where normal-mode compression utilizes dynamic range information only and high-mode compression utilizes dynamic range information as well as utilizing adjacency of location samples transmitted together in a batch, by eliminating bits which are common to several adjacent location samples within the batch.

Typically, as described, the server commands the device to transmit using a particular channel from among several available channels such as USSD, SMS, GPRS, multi-IMSI, etc. The command may for example comprise a prioritization of channels from most to least recommended for current use by the device such that if the device fails to use the most recommended channel, the device may go on to try the second most recommended channel, and so forth. The server may aggregate and store in computer data storage, channel history data characterizing degree of satisfaction (in terms of at least cost and/or communication quality or stability) from other devices' past use of particular channels in particular regions (for example, a particular provider of a particular channel may have been very satisfactory in one region and unsatisfactory in another region, over large numbers of devices respectively). This channel history data may be accessed when prioritizing channels e.g. in real time, given an individual device located in an individual region. "Least cost routing" refers to selection of channels which provide the best result both technically and in terms of actual monetary cost.

Any suitable logical combination of any suitable criteria may be employed by the server's in order to decide, and command the device, e.g. regarding yes/no tracking mode; length of sampling and reporting periods, level of compression, and choice of channel. For example, the criteria may include but not be limited to whether or not an end-user associated with a wandering device is on-line; the extent to which a wandering device is in motion (speed e.g.), degree of satisfaction from particular channels, generally or per-region, in the past; other criteria described herein, the level of confidence in each criterion, and interactions between the above decisions e.g. if the USSD channel is selected, there may be less opportunity to batch data which may mean that compression transmitting only delta's between adjacent location samples within a batch may be less attractive, relative to situations in which a data channel is selected, in which case batches may be larger hence compression transmitting only deltas between adjacent location samples within a batch may become more attractive. Choice of and/or prioritization of channels may in turn be constantly monitored by the servers and adjusted in real time based inter alia on the operating mode of each device. At every communication event the server may direct the device re which channel to use for a response.

It is appreciated that the allocation of functionality between servers and devices need not be as described herein and instead, functionalities described as server functionalities may be distributed to the devices and vice versa, functionalities described as device functionalities may be centralized at the server/s.

The population of devices whose locations are to be monitored is now described. Typically, each such wandering device comprises a GPS receiver and a GSM transmitter/receiver chipset. The GPS integrated circuit may for example comprise the Mdiatek MT3336 and the GSM chipset may for example comprise the Mdiatek MT6250. The GPS integrated circuit detects GPS signals received from deployed GPS satellites and computes GPS coordinates (some or all of latitude, longitude, altitude and speed) which location information is transmitted via the GSM chipset over the GSM cellular network to servers which process the location data to make it available to users via a viewing functionality e.g. website or app on a mobile device. Typically, the device comprises internal GPS and GSM antennas and communication with the server occurs via a selected one of SMS, USSD and CPRS channels. The GPS antenna is tuned to receive the GPS satellites's signals. A processor which may be on board the device interprets the received GPS signals and produces therefrom Latitude and Longitude coordinates to represent the exact location of the device. The GSM receiver/transmitter is used to connect to the GSM cellular network thereby to yield communication between the device and its server/s, anywhere (typically in the world) where there is GSM cellular network coverage.

The GSM Controller may used as the main processor for the device as well as for controlling some or all of RF, Power and GSM operations. Typically, the device includes a 3D sensor including an accelerometer that detects device movements hence is a source of information re whether or not the device is in motion. Suitable hardware e.g. RF Power Amplifier—31 dbm max regulates the transmitting power output of the device. A SIM card may be employed to identify the device to the GSM network. Flash Memory may be employed to store system configuration and tracking data.

An example of suitable operational parameters for the hardware may be: GSM—quad band transmitter receiver operating at the quad band frequencies of 850 MHZ, 900 MZH, 1800 MHZ, 1900 MHZ. Transmitter max power—30 dbm; antenna gain—30 db. Rated current—1.5 ma to 30 ma. UPS chip—rated at 3 mw to 24 mw power consumption depending on acquisition mode. 22 tracking channels, 66 channels for acquisition. GPS sensitivity 165 dbm. Universal USB interface may be utilized to update software to the device.

If a device is requested to report its location, but cannot get a GPS location fix (for example due to being indoors or otherwise unable to receive satellite signals), the device typically sends information identifying nearby cellular antennas; this information is available through the mobile operator's GSM network. System server computes and displays an approximated location based on the GSM data.

Any suitable messaging protocol may be used to transfer data between the GPS device (TGD) to the Server (TS) and hack. An example GPS/USSD-based messaging protocol operative for regulating communication between server (also termed herein "TS") typically including compression/decompression and encoding/decoding of location samples, is now described in detail. There are 3 types of messages:

ControlMessage—sent from the server (TS) to the wandering device (TGD) to control/configure/command.

NotificationMessage—sent from the wandering device (TGD) to the server (TS) to notify of a specific event/alert.

TrackingMessage—a flow of messages sent from the wandering device (TGD) to the server (TS) in "tracking mode".

1. Message Flows for each of the message types are now described.

ControlMessages may be sent from the server (TS) to the wandering device (TGD). Ack via NotificationMessage with MsgID=0x0, e.g. as shown in FIG. 1a.

NotificationMessages may be sent from the wandering device (TGD) to the server (TS).

Figure 1B:
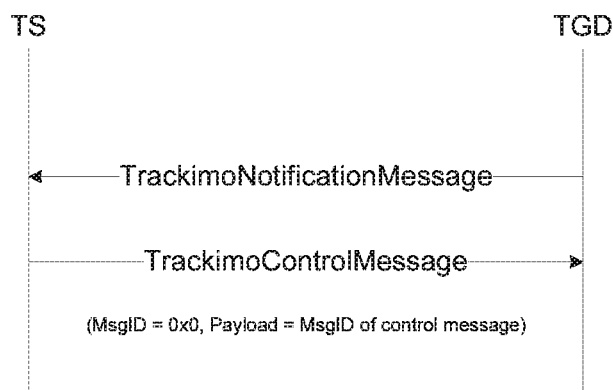

Ack via ControlMessage with MsgID=0x0 e.g. as shown in FIG. 1b.

Figure 2:
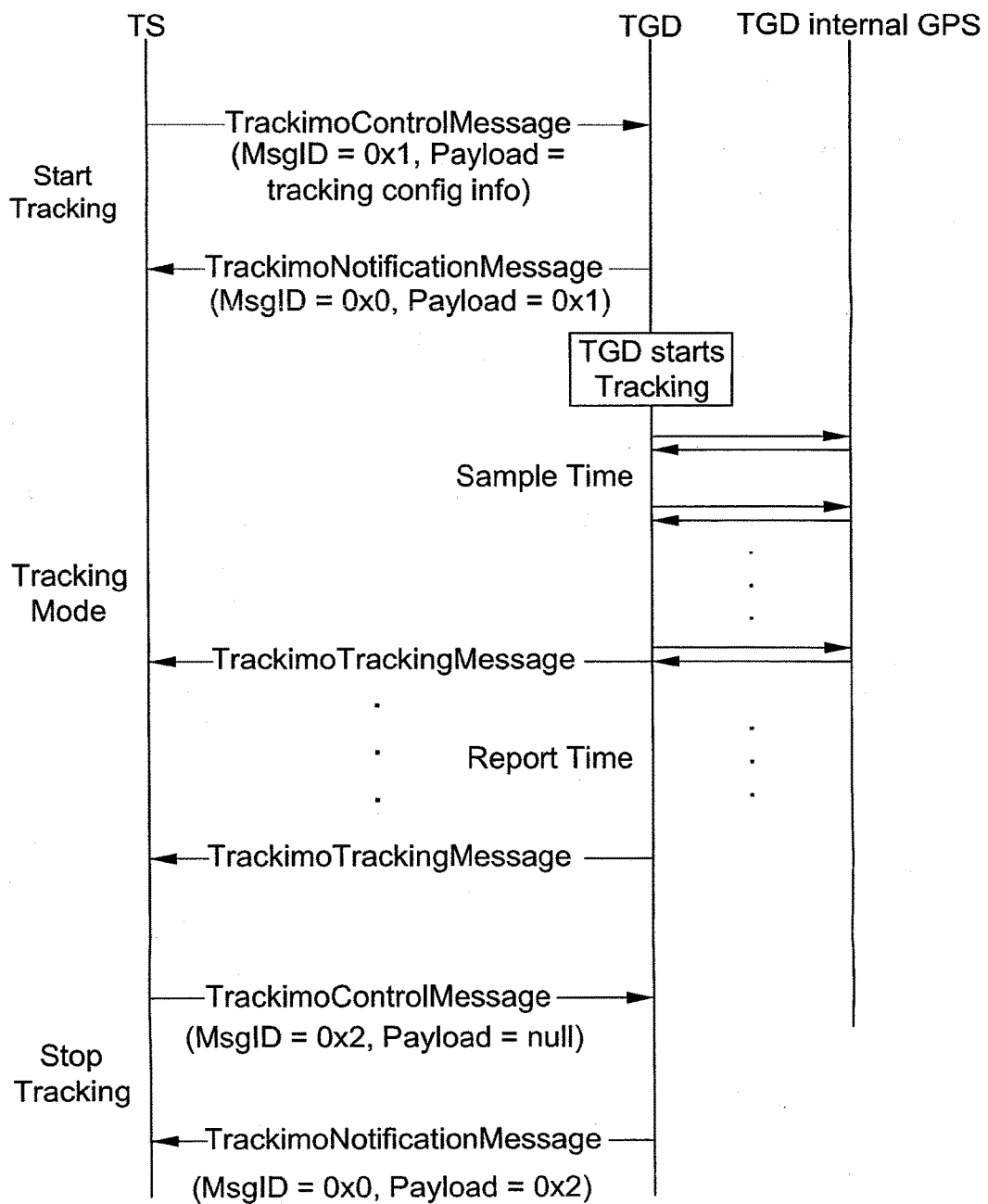

A Tracking Mode protocol is shown in the diagram of FIG. 2.

Each ControlMessage may have the message structure shown in FIG. 3a.

Each NotificationMessage may have the message structure shown in FIG. 3b.

On Data channel, Device ID may also be added after MsgID since all devices notify on the same port Each TrackingMessage may have the message structure shown in FIG. 3c, This may employ Device ID which may be added to the configuration.

Messages Content

ControlMessage content may include some or all of the elements set out in the table of FIGS. 4a-4f.

The Set Alarm Messages Payload (as per MSGID=0x6 in the table of FIGS. 4a-4f) may for example be in accordance with the diagram of FIG. 5a, where:

AlarmID—Sequential number supplied by the server
AlarmMode—0: Single—remove after trigger, 1: Continuous—keep active until stop event
Cooldown—number of minutes to wait before sending a new notification in continuous mode.
Alarm types may include some or all of those shown in the table of FIG. 5b.

NotificationMessage content may include some or all of the elements set out in the table of FIGS. 6a-6c. The Get History (0x11) element is used to pull historical location data stored in the device, due to loss of coverage. Definitions may be:
From Timestamp—Linux timestamp (seconds since 0:00:00 Jan. 1, 1970*), 0—since beginning. Linux timestamps are described online e.g. at epichconverter.com.
To Timestamp—Linux timestamp (seconds since 0:00:00 Jan. 1, 1970*), 0—until now.
Setting from and to timestamps to 0 includes all history stored in device.
After successful retrieval, the device may delete all retrieved locations from its memory.
The Message Payload of the History Report at 0xd in the table of FIGS. 6a-6c may be in accordance with the diagram of FIG. 9, where:
  # of samples sent the number of locations sent in this message (2 bytes)
  # of samples left the number of locations left in device storage after sending this message (2 bytes)
  Absolute Linux Timestamp the absolute Linux timestamp of the first sample (seconds since 0:00:00 Jan. 1, 1970*) (4 bytes)
  Track (1-n)—The location and speed stored in the device. The format may be similar to the tracking message format. Accuracy is determined by the tracking configuration. Delta compression is always inactive.
  DTS (1-n)—Differential timestamp in minutes, since the Absolute Linux Timestamp (timestamp of first sample) (2 bytes)

Location (except in tracking mode) may be in accordance with the diagram of FIG. 7a which illustrates a scheme for efficient encoding of location coordinates into an example bit-structure.
neg=0—if location positive, 1 if location negative
above_100=0—location below 100, 1 location above 100
every digit after is mapped into 4 bits (BCD).

IP (Internet protocol) may be M accordance with the diagram of FIG. 7b which illustrates a scheme for encoding a specific IP address used by the server which sends the device the particular IP address to which the device is to send data packets. 1 byte for each one of the four numbers (each is converted to a byte).
String: typically, each char is converted to byte (ascii). Null termination is added at the end ("\0" [0x00]);
Timestamp: Miliseconds—e.g. since Unix Epoch (Jan. 1, 1970 00:00:00 GMT).

Powerup: typically, after device is turned on, the following messages shall be transmitted to the server:
  Powerup (wakeup=0/1)
  Status Report
  Single GSM location report
  Single GPS location report (if got a fix)
  Possible sanity check: If the GSM location resolved by the server is more than 600 miles (parameter) away from the previous location known in the system, per this device, the Server shall transmit a "delete file" command to the device.
Powerdown: When shut down, a Powerdown message shall be transmitted to the server.

Tracking mode is the most "data-intensive" mode in the system, where the device periodically sends a location/speed update, according to a preconfigured setup. 8 bytes/min may for example be sent on average, but this is not intended to be limiting. Tracking Configuration Information which may be used for the preconfigured setup:
  Tracking Channel: 0—USSD/1—SMS/2—Data (1 byte)
  It is appreciated that the term "data" herein may mean GPRS e.g. when reference is made to UDP/IP packets which are sent over a cellular data channel using GPRS. However, alternatively, the term "data" may refer to other technologies, e.g. 3G.
  Tracking UDP ip (4 bytes)
  Tracking UDP port (2 bytes)
  Sample Time the rate at which the UPS device samples location and speed (mins—1 byte) (ex: every 1 min).
  Report Time—the rate at which the GPS device reports location and speed to the server (mins—1 byte) (ex: every 10 min).
  Location accuracy—the accuracy of the reported location measurement (0—Low/1—High/2—Debug)
  Transmit Device ID (0—off/1—on) (1 byte)
  Delta Compression (0—off/1—on) (1 byte)
TrackingMessages may be sent to the server (TS) every "Report Time" and only if not all samples are empty e.g. not sampled. If any of the samples are not empty, all empty samples may be signified by a 0 bit.

TrackingData payload structure may include x_lat bits for latitude, x_long bits for longitude, and 1 byte for speed where the number of bits depend on location accuracy e.g. as shown in FIG. 8a.

The following method may be used for computing transmitted and recovered latitude and longitude values, and speed values, within the following ranges respectively:
- Latitude—range: 0—+/−90 degrees
- Longitude—range: 0—+/−180 degrees
- Speed—range: 0-255 MPH Using the following terminology:
numOfBits—number of bits used for transfer of value (latitude or longitude)
maxVal—maximum absolute of possible values (latitude—90, longitude—180)
val—measured value
transmitedVal—transmitted value
recoveredVal—recovered value, The computation method may employ some or all of the following steps, suitably ordered e.g. as shown:

Step 1010: convert to positive scale (e.g. as per formula 10):

$$scaledVal = val + (val < 0 ? 2*maxVal : 0)$$

Step 1020: compute hex value to transmit (e.g. as per formula 20):

$$transmitedVal = hex\left(round\left(\frac{scaledVal}{(2*maxVal)} * (2^{numOfBits} - 1)\right)\right)$$

Step 1030: Recover measured value (as per formula 30):

$$scaledRecoveredVal = \frac{dec(transmitedVal)}{2^{numOfBits} - 1} * (2*maxVal)$$

Step 1040: Convert back negatives e.g. as per formula 40):

$$recoveredVal = scaledRecaveredVal - scaledRecoveredVal > maxVal ? 2*maxVal : 0)$$

The maximum error of the above method may be:

$$maxError = \frac{2*maxVal}{(2^{numOfBits} - 1)}$$

Delta Compression Mode:

When delta compression is on, only the first location in the block may be transmitted as described above. The following locations (2, 3, . . . , n) may be represented only by their difference from the 1$^{st}$ location e.g. as shown in FIG. 8b, where parameters depend on location accuracy inter alia, e.g. as shown in FIG. 8c.

The formula employed may be the following (formula 50):

$$transmitedVal = hex\left(round\left(\frac{scaledVal - scaledVal1}{(2*maxVal)} * (2^{numOfBits} - 1)\right)\right)$$

Transmission may employ only: delta_lat or delta_long bits.
Example: Assume
numOfBits=24
maxVal=180 (longitude)
val=−73.159976
scaled Val=286.840024
transmitedVal=cbf9a1
scaledRecoveredVal=286.84001963377
recoveredVal=−73.159980366229
The maximum error may then be: maxError=2.1457673398118E-5
Send Set Alarm of Type Fence:
AlarmID: 0x1 a (generated by server)→0x1a
AlarmType: 0x0 (Fence)→0x0
AlarmMode: 1 (continuous)→0x1
North: 34.233231→+034233231 0x2b 0x30 0x33 0x34 0x32 0x33 0x33 0x32 0x33 0x31
South: 34.233237→+034233237→0x2b 0x30 0x33 0x34 0x32 0x33 0x33 0x32 0x33 0x37
East: −132.323239→−132323239→0x2d 0x31 0x33 0x32 0x33 0x32 0x33 0x32 0x33 0x39
West: −132.323230→−132323230→0x2d 0x31 0x33 0x32 0x33 0x32 0x33 0x32 0x33 0x30
Trigger Direction: 1—(out)→0x01
Message:
0x1a 0x01 0x2b 0x30 0x33 0x34 0x32 0x33 0x32 0x33 0x31 0x2b 0x30 0x33 0x34 0x32 0x33 0x33 0x32 0x33 0x37 0x31 0x33 0x32 0x33 0x32 0x33 0x32 0x33 0x39 0x2d 0x31 0x33 0x32 0x33 0x32 0x33 0x32 0x33 0x30 0x01
Tracking Mode Message:
Any suitable method may be employed to compute lat/long values based on received data
In this example: Sample Time—1 min, Report Time—1 min
Accuracy—low (lat—23 bits, long—24 bits)
Latitude: −73.212670 transmitted: 0x4b100a→01001011111000000001010
Longitude: 123.344334→0x57b626→010101110110110001001 10
Speed: 109 mph→0x6d→1101101.
Bit 0—0 (tracking message) and Bit 1—1 (data available)
Message:
01010010111110000000010100101011110110110001001 101101101
Tracking Mode Batch:
Sample Time—1 min, Report Time—3 min
Accuracy high lat—31 bits, long—32 bits)
Lat1: −73.212670→transmitted: 0x4bf00a48→01001011111100000000101001001000
Long1: 123.344334→transmitted: 0x57b62698→01010111011011000100110010011000
Speed1: 109 mph→0x6d 1101101
Lat2: −73.213670→transmitted: 0x4befdbad→01001011111011111101101110101101
Long2: 123.346334→transmitted: 0x57b683cd→01010111011011010000011111001101
Speed2: 110 mph→0x6e→1101110.
No data in 3$^{rd}$ sample
Message:
01010010111110000000010100100100001010101111011 01100010011010011000110110110100101111101111101 10111010110101010111101101101000001111001101110 1 1100

The following API description describes an example format of communication between applications (website or mobile) to send instructions to or get information from, a central server. It is appreciated that the term "server" may include any processor or group thereof, not necessarily co-located, which is responsible for computation and communication characteristic of a server in a server-client relationship; server functionalities can of course be split among several sites to support system loads. Typically, apps interact with a server or "TS" rather than directly with the devices or "TGDs"; whereas the server sends commands to and gets status reports and alerts (notifications) from, the devices, and updates the apps accordingly.

API Methods and Parameters:

method is passed by GET using "action" key using API URL, parameters are passed using POST always, response is JSON always.

Action=>parameters:
login=>"email", "password"
logout=>no parameters needed
login_and_activate_device=>"email", "password", "device_id", "device_name" (device nickname)
signup=>"email", "password", "device_id", "device_name" (device nickname)
forgot_password "email"
The following may require a user_id in session (after login):
get_current_user=>no parameters needed
change_password
get_device_location=>"device_id", "timezone"
get_device=>"device_id", "timezone"
get_device_history=>"from_date" (unix timestamp), "to_date" (unix timestamp), "device_id", "timezone"
get_device_fences=>"device_id"
get_devices=>"timezone"
get_notifications=>"timezone"
get_device_settings=>"device_id"
get_dashboard=>"timezone"
delete_notification=>"notification_id"
delete_all_notification=>no parameters needed
create_fence=>"device_id", "name", "lat1", "long1", "lat2", "long2", "direction" (0—out to in, 1—in to out, 2—both)
edit_fence=>"device_id", "fence_id", "name", "lat1", "long1", "lat2", "long2", "direction" (0—out to in, 1—in to out, 2—both)
delete_fence=>"device_id", "alarm_id" (this is the fence id)
set_tracking mode=>"device_id", "tracking mode" (0 for manual on demand, 1 for 1 min, 2 for 5 min, 3 for 30 min, 4 for 120 min)
set_speed_limit_alarm:=>"device_id", "enable" (true/false), "speed_limit_alarm_value"
(speed from which alarm may be triggered)
set_low_battery_alarm=>"device_id", "enable" (true/false)
set_moving_start=>"device_id", "enable" (true/false)
set_moving_stop=>"device_id", "enable" (true/false)
set_button_alarms=>"device_id", "right_key" (true/false), "left_key" (true/false), "sos_key" (true/false)
set_device_icon=>"device_id", "icon_id" (constant from 1 to the number of icon images on the server
set_device_name=>"device_id", "name"
associate_device=>"device_id", "user_id"
associate_device_with_current_user=>"device_id"
create_device=>"imsi", "msisdn"
get_device_extended_details=>"device_id"
Typically:
login_and_activate_device is a wrapper for login and then associate_device_with_current_user
get_dashboard is made of get_devices+get_notifications, each of get_devices is made off get_device_settings (the "settings property in device object), get_device_location (the "location" property in the device object)
create_fence and edit_fence may require two points to build a rectangle e.g. south west and north east points define a unique rectangle.

It is appreciated that the above API is presented merely by way of example and instead, any suitable API may be employed. For example, a REST (Representational State Transfer) API may be employed which employs RESTful commands such as HTTP GETs and POSTs.

The method of operation of the system shown and described herein may include some or all of the steps shown in FIG. 10, suitably ordered as shown:

Step 10: tag wanderers to be monitored (kids, pets, luggage, vehicle . . . ) with trackable devices having co-located accelerometers Step 20: use a processor to register end-user/s associated with each device & provide access to viewer functionality (website/phone app e.g.)

Step 30: use a processor to store per-channel cost info per region & per country Step 40: use a processor to command devices to conserve battery power by sampling location yes/no with hi/lo periodicity as function of being mobile/stationary Step 50: use a processor to generate and send channel prioritization info to devices, based inter alia on step 80 herein, typically, select high-reliability/"data" communication channel (e.g. GPRS or 3G) or low-reliability communication channel (USSD or SMS, e.g.), based on comparison of current relative cost effectiveness of channels (financial cost &/or performance)

Methods and systems shown and described herein may be applicable to formats which are not identical to USSD, SMS and other example formats mentioned herein but which have relevant features in common therewith.

Decision logic for selecting a channel need not be exactly as described in examples presented herein. The decision logic may for example be operative to achieve a suitable, typically pre-determined trade-off between cost-effectiveness (e.g. based on data roaming cost inter alia) on the one hand, and delivering data accurately and timely on the other hand. To achieve that, the server and/or device may decide on a channel for transmitting an upcoming set of data units, based on suitable considerations as described herein, possibly including one or more of:

a. the type of channel (cellular data or USSD). For example, a data channel my normally be preferred as being more reliable and allowing longer data sequences to be transmitted in less transmission operations, thereby to facilitate greater compression; however, perhaps where data is significantly more expensive than a predetermined threshold, USSD (or SMS) may be preferred);

b. the assumed quality of a channel in the area where the device is located; e.g. if in some areas history has been stored Which indicates that the data link is less reliable, USSD may be prioritized or "given the first chance", relative to the data channel;

c. the actual quality of the channel as experienced in real time (for example, if the system tries transmission over one type of channel but receives unexpected errors or delays, a different channel may be tried), d. indications of high load on the communication network at a given time.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present invention, inter alia, are electromagnetic signals carrying computer-readable instructions for performing any or all of the steps or operations of any of the methods shown and described herein, in any suitable order including simultaneous performance of suitable groups of steps as appropriate; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; a processor configured to perform any combination of the described steps or to execute any combination of the described modules; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A system for monitoring locations of each of a population of wandering devices, each having localizing functionality, the system comprising:

a tracking functionality operative for monitoring locations of each of the population of wandering devices and accordingly, providing location information which characterizes individual wandering devices from among said population, via a viewing functionality, to corresponding end-users registered in respective association with the wandering devices; and an interface with said wandering devices operative to command that location information regarding at least one individual wandering device be transmitted to said tracking functionality more frequently if at least one individual end-user registered in respective association with the individual wandering device is logged onto a viewing functionality and less frequently if no end-user registered in respective association with the individual wandering device is logged onto the viewing functionality, wherein said location information transmitted less frequently includes wandering device location samples transmitted to said tracking functionality in larger groups than said location information transmitted more frequently.

2. The system according to claim 1 wherein said wandering device location samples transmitted to said tracking functionality in batches are transmitted in compressed form, by eliminating bits which are common to more than one adjacent location sample.

3. The system according to claim 1 wherein location information regarding an individual wandering device is transmitted to said tracking functionality after being compressed by a compression functionality and wherein said compression functionality takes into account an effective dynamic range of the location information by eliminating from said location information, those bits which are common to all location samples within said effective dynamic range.

4. The system according to claim 1 wherein at least one individual wandering device includes self-motion detection apparatus and wherein for at least said individual wandering device, location sampling is not effected while said self-motion detection apparatus indicates that said individual wandering device is stationary, thereby to conserve battery power.

5. The system according to claim 4 wherein for at least said individual wandering device, transmission of location information is at least some times delayed if said self-motion detection apparatus indicates that said individual wandering device is stationary.

6. The system according to claim 1 wherein said location information is transmitted from said wandering devices to said tracking functionality using a high-reliability communication channel or a low-reliability communication channel, and wherein one of said channels is selected for usage based on a comparison of current relative cost effectiveness of said channels.

7. The system according to claim 1 and also comprising networked viewing functionality through which said location information which characterizes individual wandering devices from among said population is provided to said corresponding end-users.

8. The system A system according to claim 1 wherein said location information transmitted less frequently includes wandering device location samples transmitted to said tracking functionality in batches of more than one sample each whereas said location information transmitted less frequently includes wandering device location samples transmitted to said tracking functionality individually.

9. A method for monitoring locations of each of a population of wandering devices, each having localizing functionality, the method comprising:

providing a tracking functionality which uses a processor for monitoring locations of each of the population of wandering devices and accordingly, providing location information which characterizes individual wandering devices from among said population, via a viewing functionality, to corresponding end-users registered in respective association with the wandering devices; and using a processor to command that location information regarding at least one individual wandering device be transmitted to said tracking functionality more frequently if at least one individual end-user registered in respective association with the individual wandering device is logged onto a viewing functionality and less frequently if no end-user registered in respective association with the individual wandering device is logged onto the viewing functionality, wherein said location information transmitted less frequently includes wandering device location samples transmitted to said tracking functionality in larger groups than said location information transmitted more frequently.

10. The method according to claim 9 wherein location information regarding an individual wandering device is transmitted to said tracking functionality after being compressed by a compression functionality which takes into account an effective dynamic range of the location information by eliminating from said location information, those bits which are common to all location samples within said effective dynamic range.

11. A computer program product, comprising a non-transitory tangible computer readable medium having computer readable program code embodied therein, said computer readable program code adapted to be executed to implement a method for monitoring locations of each of a population of wandering devices, each having localizing functionality, the method comprising:

providing a tracking functionality which uses a processor for monitoring locations of each of the population of wandering devices and accordingly, providing location information which characterizes individual wandering devices from among said population, via a viewing functionality, to corresponding end-users registered in respective association with the wandering devices; and using a processor to command that location information regarding at least one individual wandering device be transmitted to said tracking functionality more frequently if at least one individual end-user registered in respective association with the individual wandering device is logged onto a viewing functionality and less frequently if no end-user registered in respective association with the individual wandering device is logged onto the viewing functionality, wherein said location information transmitted less frequently includes wandering device location samples transmitted to said tracking functionality in larger groups than said location information transmitted more frequently.

12. The system according to claim 1 wherein said tracking functionality communicates with said population of wandering devices using a higher-reliability communication channel or a lower-reliability communication channel, and wherein one of said channels is selected for usage based on a comparison of current relative cost effectiveness of said two channels.

13. The system according to claim 3 and also comprising networked viewing functionality through which said location information which characterizes individual wandering devices from among said population is provided to said corresponding end-users.

14. A system for monitoring locations of each of a population of wandering devices, each having localizing functionality, the system comprising:

a tracking functionality operative for monitoring locations of each of the population of wandering devices and accordingly, providing location information which characterizes individual wandering devices from among said population, via a viewing functionality, to corresponding end-users registered in respective association with the wandering devices; and an interface with said wandering devices operative to command that location information regarding at least one individual wandering device be transmitted to said tracking functionality more frequently if at least one individual end-user registered in respective association with the individual wandering device is logged onto a viewing functionality and less frequently if no end-user registered in respective association with the individual wandering device is logged onto the viewing functionality, wherein said location information transmitted more frequently and said location information transmitted less frequently both include information sampled at the same rate such that said location information transmitted less frequently includes wandering device location samples transmitted to said tracking functionality in larger groups than said location information transmitted more frequently.

15. A method for monitoring locations of each of a population of wandering devices, each having localizing functionality, the method comprising:

providing a tracking functionality which uses a processor for monitoring locations of each of the population of wandering devices and accordingly, providing location information which characterizes individual wandering devices from among said population, via a viewing functionality, to corresponding end-users registered in respective association with the wandering devices; and using a processor to command that location information regarding at least one individual wandering device be transmitted to said tracking functionality more frequently if at least one individual end-user registered in respective association with the individual wandering device is logged onto a viewing functionality and less frequently if no end-user registered in respective association with the individual wandering device is logged onto the viewing functionality, wherein said location information transmitted more frequently and said location information transmitted less frequently both include information sampled at the same rate such that said location information transmitted less frequently includes wandering device location samples transmitted to said tracking functionality in larger groups than said location information transmitted more frequently.

16. The system according to claim 14, wherein said wandering device location samples transmitted to said tracking functionality in batches are transmitted in compressed form, by eliminating bits which are common to more than one adjacent location sample.

17. The system according to claim 14, wherein location information regarding an individual wandering device is transmitted to said tracking functionality after being compressed by a compression functionality and wherein said compression functionality takes into account an effective dynamic range of the location information by eliminating from said location information, those bits which are common to all location samples within said effective dynamic range.

18. The system according to claim 14, wherein at least one individual wandering device includes self-motion detection apparatus and wherein for at least said individual wandering device, location sampling is not effected while said self-motion detection apparatus indicates that said individual wandering device is stationary, thereby to conserve battery power, wherein for at least said individual wandering device, transmission of location information is at least some times delayed if said self-motion detection apparatus indicates that said individual wandering device is stationary.

19. The system according to claim 14, wherein said location information is transmitted from said wandering devices to said tracking functionality using a high-reliability communication channel or a low-reliability communication channel, and wherein one of said channels is selected for usage based on a comparison of current relative cost effectiveness of said channels.

20. The system according to claim 14, and also comprising networked viewing functionality through which said location information which characterizes individual wandering devices from among said population is provided to said corresponding end-users.

21. The system according to claim 14, wherein said location information transmitted less frequently includes wandering device location samples transmitted to said tracking functionality in batches of more than one sample each whereas said location information transmitted less frequently includes wandering device location samples transmitted to said tracking functionality individually.

22. The method according to claim 15, wherein location information regarding an individual wandering device is transmitted to said tracking functionality after being compressed by a compression functionality and wherein said compression functionality takes into account an effective dynamic range of the location information by eliminating from said location information, those bits which are common to all location samples within said effective dynamic range.

23. The method according to claim 15, wherein at least one individual wandering device includes self-motion detection apparatus and wherein for at least said individual wandering device, location sampling is not effected while said self-motion detection apparatus indicates that said individual wandering device is stationary, thereby to conserve battery power, wherein for at least said individual wandering device, transmission of location information is at least some times delayed if said self-motion detection apparatus indicates that said individual wandering device is stationary.

24. The method according to claim 15, wherein said location information is transmitted from said wandering devices to said tracking functionality using a high-reliability communication channel or a low-reliability communication channel, and wherein one of said channels is selected for usage based on a comparison of current relative cost effectiveness of said channels.

25. The method according to claim 15, wherein said location information transmitted less frequently includes wandering device location samples transmitted to said tracking functionality in batches of more than one sample each whereas said location information transmitted less frequently includes wandering device location samples transmitted to said tracking functionality individually.

* * * * *